United States Patent
Heemskerk et al.

(10) Patent No.: US 7,187,640 B2
(45) Date of Patent: Mar. 6, 2007

(54) METHOD FOR RECORDING ON MULTI-LAYER PHASE-CHANGE OPTICAL DISCS

(75) Inventors: Jacobus Petrus Josephus Heemskerk, Eindhoven (NL); Igolt Pieter Douwes Ubbens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 628 days.

(21) Appl. No.: 10/227,210

(22) Filed: Aug. 23, 2002

(65) Prior Publication Data

US 2003/0048733 A1 Mar. 13, 2003

(30) Foreign Application Priority Data

Aug. 28, 2001 (EP) ................................ 01203212

(51) Int. Cl.
*G11B 7/0045* (2006.01)
(52) U.S. Cl. ......................... 369/94; 369/100; 369/283

(58) Field of Classification Search .................. 369/94, 369/100, 283
See application file for complete search history.

(56) References Cited

U.S. PATENT DOCUMENTS

| | | | | |
|---|---|---|---|---|
| 5,202,875 A | * | 4/1993 | Rosen et al. | 369/94 |
| 5,414,451 A | | 5/1995 | Sugiyama et al. | 347/258 |
| 5,625,609 A | * | 4/1997 | Latta et al. | 369/44.23 |
| 6,552,985 B1 | * | 4/2003 | Wierenga | 369/53.22 |
| 6,587,415 B1 | * | 7/2003 | Imai et al. | 369/53.22 |

* cited by examiner

*Primary Examiner*—Wayne Young
*Assistant Examiner*—Van T. Pham
(74) *Attorney, Agent, or Firm*—Michael E. Belk

(57) ABSTRACT

A method and a recording device for formatting arid recording on a multi-layer phase-change type optical disc include recording areas on first and second layers of the optical disc according to a predefined sequence, so that an area of the first layer where an incident radiation beam passes through is always fully written or fully empty when recording on the second layer.

18 Claims, 3 Drawing Sheets

METHOD FOR RECORDING ON MULTI-LAYER PHASE-CHANGE OPTICAL DISCS

The present invention relates in general to recording information on a multi-layer recordable disc and more particularly to a method for formatting and first-time recording on a multi-layer phase-change type optical disc. The invention also relates to a recording device for formatting and first-time recording on a multi-layer phase-change type optical disc.

It is known to use a dual-layer structure to increase the recording capacity of an optical disc such as, for example, a CD or a DVD. Such a dual-layer optical disc of the phase-change type has two superposed phase-change recording layers. A phase-change type recording layer has a phase reversibly changeable between an amorphous phase and a crystalline phase. Hereinafter, L0 denotes a first recordable layer as seen from an objective lens and incident laser beam for recording, and L1 denotes a second recordable layer positioned behind the first layer L0 as seen from the objective lens and incident laser beam for recording.

A requirement for read-out of the second layer L1 is that the transmission of the first layer L0 is homogeneous across the beam diameter of the radiation beam (for example, a laser light beam) focused into a spot on the second layer L1. A similar requirement holds for recording on the second layer L1. Therefore, it is a practical requirement to use a 'continuous groove' format, preferably without any headers, as the pregroove format of an optical disc. Only in that case, data can be written and read anywhere on the second layer L1 without disturbing interference being caused by the radiation beam passing the first layer L0.

However, the above format requirement is not sufficient for correct access to L1 when L0 is partially written. Again differences in transmission across the radiation beam diameter will disturb the radiation spot focused on the second layer L1 when reading or writing. One known solution is to add an additional requirement to the transmission characteristics of the first layer L0 such that the transmission is identical for both the amorphous phase and the crystalline phase of the first phase change layer L0. Such a solution imposes a severe and unnecessary limitation on the choice of materials for the L0 recording layer.

In spite of the recognized need, a continuing failure in the art has been an inability to allow the use of dual layer technology for recording the second layer without, for example, imposing a requirement on the transmission characteristics of the first recording layer such that the transmission is identical for both the amorphous and the crystalline phases of the first layer.

In view of the above deficiencies associated with currently available dual-layer or multi-layer optical disc technology, especially phase-change type optical disc technology, the present invention has been developed to alleviate these drawbacks and provide further benefits to the user. These enhancements and benefits are described in greater detail hereinafter with reference to illustrative embodiments of the present invention.

An embodiment of the present invention provides a method for formatting and recording on a multi-layer phase-change type optical disc that includes, for example, recording areas on the first and second layers of the optical disc according to a predefined sequence, thus assuring that an area of the first layer through which an incident radiation beam passes is always fully written or fully empty upon recording on the second layer in order to prevent interference with the incident radiation beam from the first layer upon recording on the second layer. According to one aspect, the first layer is completely written before writing on the second layer. According to another aspect, pregroove addresses for the first and second layers are allowed to increase from an inside diameter of each layer to an outside diameter of each layer, and a separate de-ice address is defined for each of the first and second layers, so that de-icing of the first layer always progresses by a pre-defined amount in advance of de-icing on the second layer. De-icing is understood to be the process of first time formation of amorphous marks in an initialized phase change layer (that is a layer entirely having a crystalline phase).

According to a further aspect of a version of the method of the present invention, pre-determined areas on inner and outer peripheries of the second layer that are reserved for non-user data are pre-formatted before the writing of user-definable files on the first recording layer commences. According to this aspect, a first de-ice address for the second layer is defined that shows as far as which position the second layer is de-iced and a second de-ice address for the second layer is defined that shows as from which position the second layer is de-iced, and it is confirmed that the first layer is fully de-iced above de-iced areas at inner and outer peripheries of the second layer before the disc is ejected from a recording device. Pre-formatting is understood to be the process of de-icing where the marks are formed according to a predefined format such as, for example, the CD-format and the DVD-format.

Still another aspect of the method according to a version of the present invention involves completely writing the first layer before commencing writing of user-definable data on the second layer of the disc.

The beneficial effects described above apply in general to the exemplary devices, mechanisms and method steps disclosed herein with regard to formatting and first-time recording on dual-layer or multi-layer phase-change type optical discs. The specific structures and steps whereby such benefits are delivered will be described in greater detail hereinafter.

Detailed descriptions of embodiments of the present invention are given hereafter. However, it is to be understood that the disclosed embodiments are merely exemplary of the invention and may be embodied in various and alternative forms. The figures are not necessarily to scale, as some features may be exaggerated or minimized to show details of particular components. Therefore, specific structural and functional details disclosed herein are not to be interpreted as limiting, but merely as a basis for the claims and as a representative basis for teaching a person skilled in the art various ways of employing the present invention.

Figure 1:
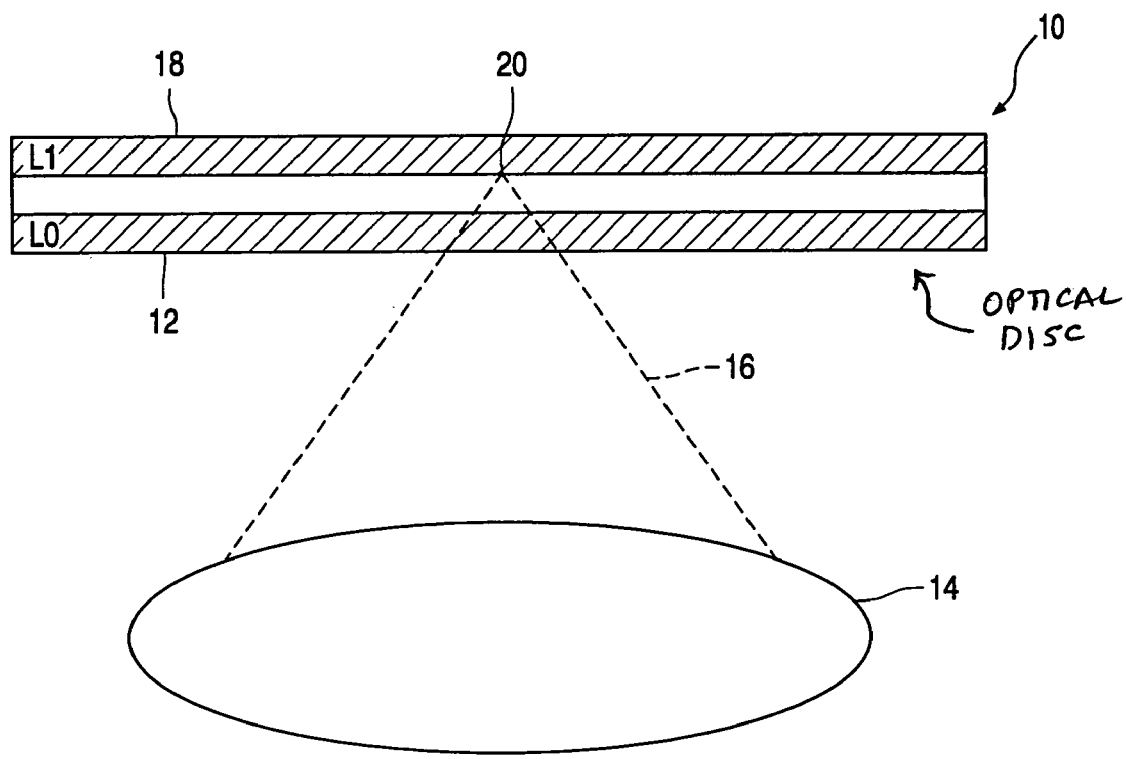
FIG. 1 is a diagrammatic representation of an example of a structure of an optical disc with two superposed phase-change recording layers for use in embodiments of the present invention.

FIG. 1 is a diagrammatic representation of an example of a structure of an optical disc with two superposed phase-change type recording layers for use in embodiments of the present invention. Referring to FIG. 1, the optical disc 10 has a first recordable layer 12 as seen from the objective lens 14 and the incident radiation beam 16 for recording, and a second recordable layer 18 positioned behind the first layer 12 as seen from the objective lens 14 and the incident laser beam 16 for recording. The phase-change type recordable layers 12, 18 have a phase reversibly changeable between an amorphous phase and a crystalline phase. In general, a recordable layer is initially in a crystalline phase. Information is recorded on such a recordable layer by forming marks on the layer having an amorphous phase. Such marks are formed by irradiating areas on the recordable layer by a radiation beam having a sufficiently high radiation power level. The information is then represented by the pattern formed by the marks. This information is read by scanning the disc with a radiation beam having a read power level which is well below the write power level, and by converting the radiation reflected from the disc into an electrical signal. The recorded information can be erased by irradiating areas comprising the marks with a radiation beam having an erase power level which is in general between the write power level and the read power level, causing the irradiated areas to enter the crystalline phase.

In general, areas having an amorphous phase and areas having a crystalline phase have different optical properties such as, for example, the transmission. To prevent the influence of differences in transmission across the diameter of the radiation beam 16 that disturb the radiation spot 20 focused on the second layer 18 for reading or writing, an embodiment of the present invention provides a method for defining the sequence(s) in which the recordable layers 12, 18 should be recorded. A method according to the present invention also defines the sequence(s) in which areas on the layers 12, 18 should be recorded.

Generally speaking, the method according to the present invention ensures that the part of the first layer 12 where through the radiation beam 16 passes is always fully written or fully empty when recording on the second layer 18. The method of the present invention defines rules for the sequence(s) in which various areas on the first layer 12 and on the second layer 18 are recorded in order to prevent interference from the first layer 12 when recording on the second layer 18.

Figure 2:
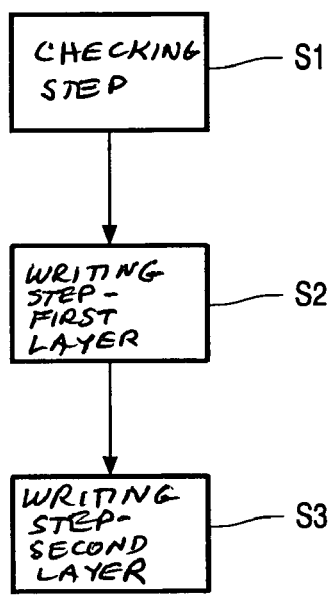
FIG. 2 shows a flow chart which illustrates embodiments of the method according to the present invention.

One aspect of an embodiment of the present invention involves, for example, first writing (i.e. de-icing, preformatting or recording user information) the first layer 12 completely before ever writing on the second layer 18. FIG. 2 shows a flow chart which illustrates an example of a process of first writing the first layer completely before ever writing on the second layer according to an embodiment of the present invention. Referring to FIG. 2, in a first step S1, before writing on the first layer 12, a check is made to confirm non-commencement of writing on the second layer 18. If confirmed, in a second step S2, writing can commence on the first layer 12 and continue to completion. In a third step S3, upon completion of writing on the first layer 12, writing on the second layer 18 can commence.

Another aspect of an embodiment of the present invention involves, for example, allowing the pregroove addresses for both recordable layers 12, 18 to increase from the inside (towards the center of the disc 10) to the outside (towards the circumference of the disc 10). In addition two separate 'de-ice addresses' are defined, one of which is for the first recordable layer 12 and the other of which is for the second recordable layer 18, subject to the limitation that de-icing on the first layer 12 must always have progressed a specified amount further than de-icing on the second layer 18.

An example of a process which involves de-icing on the first layer which leads by a specified amount the de-icing on the second layer according to an embodiment of the present invention is also illustrated with reference to the flow chart in FIG. 2. Now, in the step S1 the pregroove addresses for both recordable layers 12, 18 are allowed to increase from the inside to the outside of the disc 10. In the step S2 two separate 'de-ice addresses' are defined, one of which is for the first layer 12 and the other of which is for the second layer 18. In the step S3 de-icing can progress on the first layer 12, but always a specified amount ahead of de-icing on the second layer 18 according to the defined "de-ice addresses".

According to an alternative aspect of an embodiment of the present invention, before commencing writing of user-definable files on the first recording layer L0 12, certain areas on the second layer 18 that are reserved for non-user data are pre-formatted. Such areas include, for example, guard bank areas, lead-in areas, lead-out areas, defect management areas, file format areas, navigation reserve areas, and the like. These areas are situated in general at the inner and at the outer diameter of second layer 18. Now, an aspect of an embodiment of the present invention introduces (apart from the conventional de-ice address now referring only to the first layer 12) two additional de-ice addresses for the second layer 18. One of these additional de-ice addresses represents the address on the second layer 18 until which the second layer 18 is de-iced and the other of the additional de-ice addresses represents the address on the second layer 18 from which the second layer 18 is de-iced. Before ejection of the disc 10 from a drive, it is confirmed that the first layer 12 is fully de-iced above the de-iced areas at the inner and outer peripheries of the second layer 18 as indicated by the de-ice information.

Figure 3:
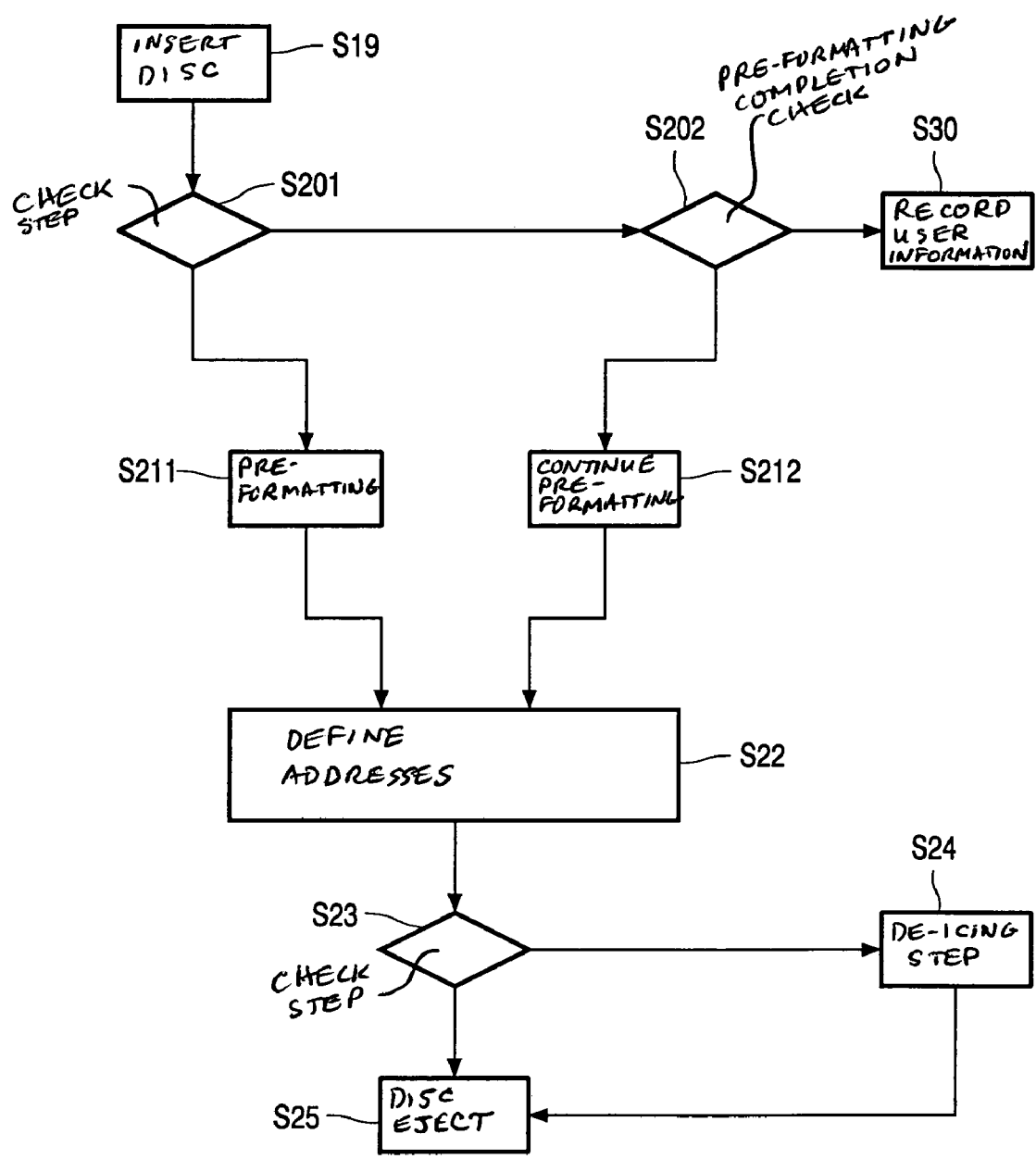
FIG. 3 shows a flow chart of a version of the method according to the present invention in which a process that includes the introduction of additional de-ice addresses is illustrated.

FIG. 3 shows a flow chart which illustrates an example of such a process that includes the introduction of additional de-ice addresses according to an embodiment of the present invention. First the disc is inserted into the drive in step S19. Next, in step S201, a check is carried out to determine whether any writing has taken place on the first layer 12 of the disc. When not, in step S211 the decision is taken to carry out pre-formatting and to complete this pre-formatting unless a Disc-Eject Command is received. During the time available between Write Commands, originating from the host computer (or from an application running on that host computer), the areas reserved on both recordable layers 12 and 18 for non-user data at the inner and outer peripheries are pre-formatted, in this example the pre-formatting first being carried out for the non-user data areas of the first layer 12. However, a Write Command from the host computer has always priority over the preformatting. When a Disc-Eject Command is received, step S22 is executed. In step S22 four de-ice addresses are defined and recorded on the disc: that is, two addresses for each of the recordable layers 12 and 18: one which represents the address until which the recording layer is de-iced and the other which represents the address as from which the layer is de-iced. In step S23 a check is carried out to confirm that the first layer 12 is fully de-iced above the de-iced areas at the inner and outer peripheries of the second layer 18 as indicated by the de-ice information. If confirmed, the disc 10 is ejected from the drive in step S25. When not confirmed, the de-icing of the first layer 12 continues in step 24 until the condition stated in step 23 is satisfied, after which the disc 10 is ejected from the drive in step S25. When in step S201 it is determined that writing has taken place on the first layer 12 of the disc, it is in step 202 determined whether the pre-formatting was completed for all layers. When not, in step S212 the decision is taken to continue the pre-formatting and to complete this pre-formatting unless a Disc-Eject Command is received. Again, during the time available between Write Commands the areas reserved on both recordable layer 12 and 18 for non-user data at the inner and outer diameter are pre-formatted. When a Disc-Eject Command is received, step S22 is executed. When in step 202 it is determined that the pre-formatting was completed for all layers, the disc is ready for recording user information in step S30 without any further preformatting or de-icing.

A further aspect of an embodiment according to the present invention involves, for example, refraining from commencing the writing of user-definable data on the second layer 18 before the first layer 12 is completely filled, because this data will be inaccessible as long as the first layer 12 is partially written. An example of a process in which the writing of user-definable data on the second layer is not commenced before the first layer is completely filled, according to an embodiment of the present invention is illustrated also with reference to the flow chart of FIG. 2. Now, in the step S1 a check is carried out to confirm non-commencement of writing of user-definable data on the second layer 18. In the step S2, if confirmed, writing can commence on the first layer 12 and continue until complete filling is obtained. In step S3, upon complete filling of the first layer 12, writing of user-definable data on the second layer 18 can commence.

Figure 4:
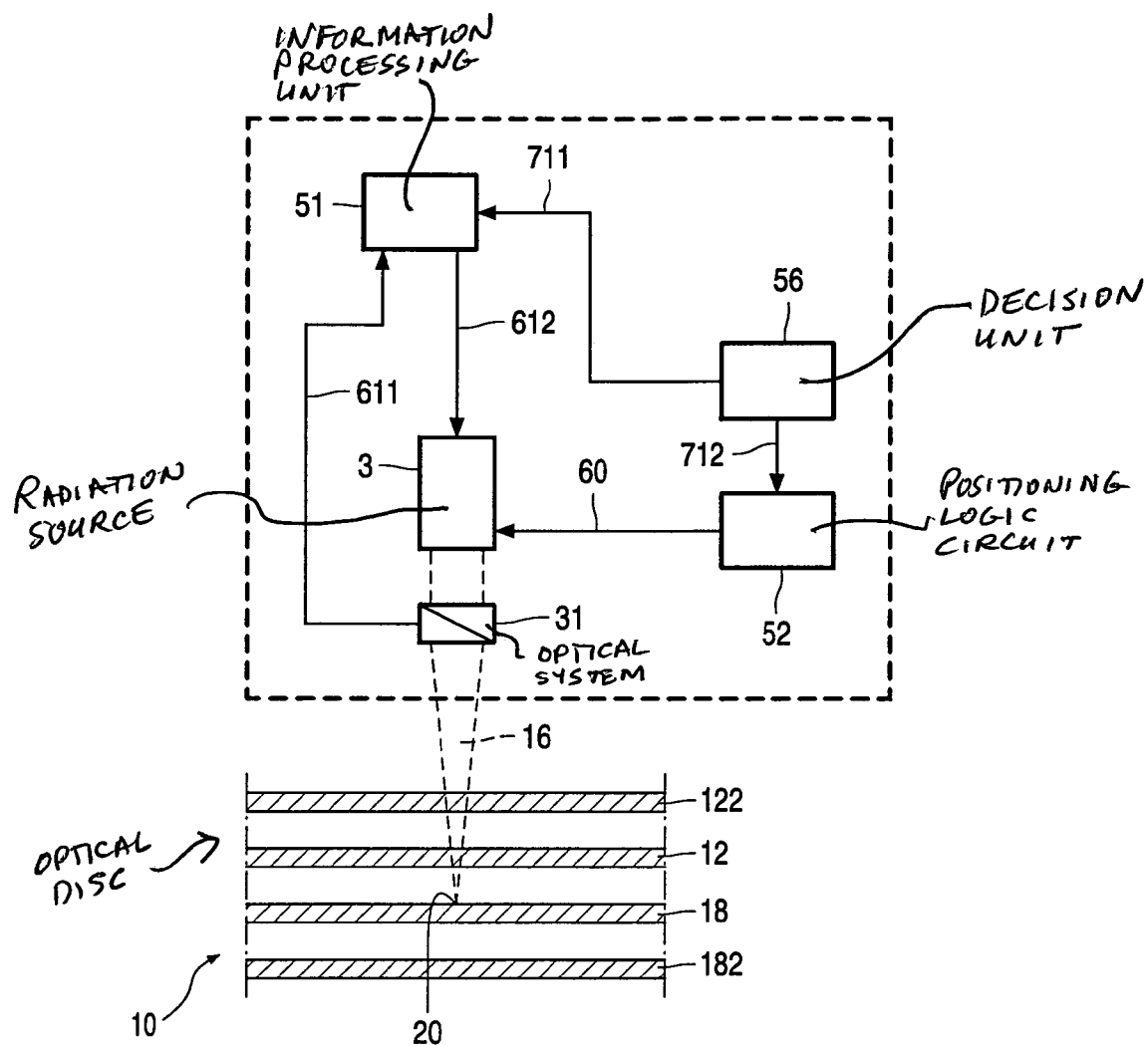
FIG. 4 shows a block diagram of a recording device in accordance with the invention in a recording apparatus for recording information onto a multi-layer phase-change optical disc.

In summary, the characterizations and anecdotal data contained herein demonstrate the utility and success of the presently disclosed invention's advantageous method for formatting and first-time recording on a multi-layer phase-change optical disc for use in multi-layer recordable disc systems such as, for example, digital video disc systems, while eliminating any need for adapting the transmission properties of the various recording layers. FIG. 4 shows a block diagram of a recording device in accordance with the invention in a recording apparatus for recording information onto a multi-layer phase-change optical disc 10. A radiation beam from a radiation source 3 such as, for example, a diode laser, is focused 20 onto one of the recordable layers 122,12,18,182 via an optical system 31 which includes the objective lens 14 (not shown in figure 4). In order to position the focal spot 20 of the radiation beam 16 on the second recordable layer 18 to be recorded, a unit which comprises a positioning logic circuit 52 applies a control signal 60 to the radiation source 3. When information is recorded onto the multi-layer optical disc 10, an information stream 612 is applied from an information processing unit 51 to the radiation source 3. When information is read from the multi-layer optical disc 10, an information stream 611is applied from the optical system 31 to the information processing unit 51.

The recording device also includes a decision unit 56 for determining and controlling the sequence of recording information onto the recordable layers 122, 12, 18, 182. An information signal 60, comprising control information about the sequence, is applied to the unit comprising the positioning logic circuit 52. The unit comprising the positioning logic circuit 52 controls the positioning of the focal spot 20 onto the recordable layers 122, 12, 18, 182 in a sequence derived from the information signal 60.

According to an embodiment of the invention the decision unit 56 controls the sequence in which information is recorded on the multi-layer optical disc 10 such that areas on the recordable layer 122 and 12 where through an incident radiation beam 16 passes are always fully written or fully empty when recording an area on the second recordable layer 18. According to a preferred embodiment the decision unit 56 controls the sequence in which information is recorded such that a higher recordable layer is completely written before recording information on a lower recordable layer (a higher recordable layer being closer to the radiation source 3 than a lower recordable layer). In an alternative embodiment the decision unit 56 controls the de-icing process or the preformatting process such that areas on the recordable layer 122 and 12 where through an incident radiation beam 16 passes are always fully de-iced or fully preformatted when recording an area on the second recordable layer 18. In a further alternative embodiment the decision unit controls the sequence in which user information is recorded onto the multi-layer optical disc 10 through a control signal 711. A first information block to be recorded on the second recordable layer 18 may be recorded on that second recordable layer later in time than a second information block to be recorded on the first recordable layer 12, even when the first information block is received by the information processing unit 51 earlier in time than the second information block. This is because recording the second information block would cause an area on the first recordable layer 12, where through the radiation beam 16 passes when recording the first information block on the second recordable layer 18, to become fully written, thereby preventing artifacts caused by the radiation beam passing an inhomogeneous area (that is an area partly written and partly non-written).

Various preferred embodiments of the invention have been described which fulfill the various objects of the invention. It should be noted that these embodiments are merely illustrative of the principles of the invention. Numerous modifications and adaptations thereof will be readily apparent to those skilled in the art without departing from the spirit and scope of the present invention.

The invention claimed is:

1. A method for formatting and recording on a multi-layer phase-change optical disc, the method comprising the acts of:
   recording in an area on a first layer and an area on a second layer of the optical disc, wherein the areas are recorded according to a predefined sequence such that the area of the first layer is fully written or fully empty upon recording the area on the second layer; and
   pre-formatting pre-determined areas on at least one of the second layer and the first layer that are reserved for non-user data comprising at least one of a guard bank area, a lead-in area, a lead-out area, a defect management area, a file format area, and a navigation reserve area.

2. The method as claimed in claim 1, further comprising the act of completely writing the first layer before writing on the second layer.

3. The method as claimed in claim 2, wherein the first layer is completely written with at least one of de-ice, preformat and user information.

4. The method as claimed in claim 1, further comprising the act of starting to write on the second layer upon completion of writing on the first layer.

5. The method as claimed in claim 1, further comprising completely writing the first layer before commencing the writing of user-definable data on the second layer.

6. The method as claimed in claim 1, further comprising the act of writing user-definable data on the second layer upon completion of filling of the first layer.

7. A recording device for formatting and recording on a multi-layer phase-change optical disc, the device comprising means for recording the area on the first layer and the area on the second layer of the optical disc, and means for executing a method according to claim 1.

8. A method for formatting and recording on a multi-layer phase-change optical disc, the method comprising the acts of:
   recording in an area on a first layer and an area on a second layer of the optical disc, wherein the areas are recorded according to a predefined sequence such that the area of the first layer is fully written or fully empty upon recording the area on the second layer; and
   defining two de-ice addresses for at least one of the first lay and the second layer, one address thereof indicating a position on the at least one of the first layer and the second layer until which the at least one of the layer and the second layer is de-iced, while the other address indicates a position on the at least one of the first layer and the second layer from which the second layer is de-iced.

9. A method for formatting and recording on a multi-layer phase-change optical disc, the method comprising the acts of:
   recording in an area on a first layer and an area on a second layer of the optical disc, wherein the areas are recorded according to a predefined sequence such that the area of the first layer is fully written or fully empty upon recording the area on the second layer; and
   defining a separate de-ice address for each of the first and the second layers, so that de-icing of the first layer progresses by a pre-defined amount ahead of de-icing on the second layer.

10. A method for formatting and recording on a multi-layer phase-change optical disc, the method comprising the acts of:
   recording in an area on a first layer and an area on a second layer of the optical disc, wherein the areas are recorded according to a predefined sequence such that the area of the first layer is fully written or fully empty upon recording the area on the second layer;
   allowing pregroove addresses for the first layer and the second layer to increase from an inside diameter of each layer to an outside diameter of each layer; and
   defining a separate de-ice address for each of the first and the second layers, so that de-icing of the first layer progresses by a pre-defined amount ahead of de-icing on the second layer.

11. A method for formatting and recording on a multi-layer phase-change optical disc, the method comprising the acts of:
   recording in an area on a first layer and an area on a second layer of the optical disc, wherein the areas are recorded according to a predefined sequence such that the area of the first layer is fully written or fully empty upon recording the area on the second layer;
   pre-formatting pre-determined areas on inner and outer diameters of the second layer that are reserved for non-user data before commencing the writing on the first recording layer;
   defining a first de-ice address for the second layer, said first address indicating until which position the second layer is de-iced;
   defining a second de-ice address for the second layer, said second address indicating which position the second layer is de-iced ;and
   fully de-icing the first layer above de-iced areas at inner and cuter radii of the second layer before ejecting the disc from a recording or reading device.

12. A method for formatting and recording on a multi-layer phase-change optical disc, the method comprising the acts of:
   recording in an area on a first layer and an area on a second layer of the optical disc, wherein the areas are recorded according to a predefined sequence such that the area of the first layer fully written or fully empty upon recording the area on the second layer; and
   pre-formatting pre-determined areas on the second layer that are reserved for non-user data comprising at least one of a guard bank area, a lead-in area, a lead-out area, a defect management area, a file format area, and a navigation reserve area.

13. A method for formatting and recording on a multi-layer phase-change optical disc, the method comprising the acts of:
   recording in an area on a first layer and an area on a second layer of the optical disc, wherein the areas are recorded according to a predefined sequence such that the area of the first layer is fully written or fully empty upon recording the area on the second layer; and
   confirming complete de-ice of the first layer above de-iced areas of the second layer as indicated by de-ice addresses.

14. A method for formatting and recording on a multi-layer phase-change optical disc, the method comprising the acts of:
   recording in an area on a first layer and an area on a second layer of the optical disc, wherein the areas are recorded according to a predefined sequence such that the area of the first layer is fully written or fully empty upon recording the area on the second layer; and
   defining two de-ice addresses for the second layer, one address thereof indicating a position on the second layer until which the second layer is de-iced, while the other address indicates a position on the second layer from which the second layer is de-iced.

15. A method for formatting and recording on a multi-layer phase-change optical disc, the method comprising the acts of:
   recording in an area on a first layer and an area on a second layer of the optical disc, wherein the areas are recorded according to a predefined sequence such that the area of the first layer is fully written or fully empty upon recording the area on the second layer; and
   confirming complete de-icing of the first layer above de-iced areas at inner and outer radii of the second layer as indicated by de-ice addresses.

16. A method for formatting and recording on a multi-layer phase-change optical disc, the method comprising the acts of:
   recording in an area on a first layer and an area on a second layer of the optical disc, wherein the areas are recorded according to a predefined sequence such that the area of the first layer is fully written or fully empty upon recording the area on the second layer; and
   ejecting the disc from a device upon confirmation that the first layer is fully de-iced above de-iced areas at inner and outer radii of the second layer.

17. A method for formatting and recording on a multi-layer phase-change optical disc, the method comprising the acts of:

recording in an area on a first layer and an area on a second layer of the optical disc, wherein the areas are recorded according to a predefined sequence such that the area of the first layer is fully written or fully empty upon recording the area on the second layer; and ejecting the optical disc from a device upon confirmation that the first layer is fully de-iced above de-iced areas of the second layer.

18. The method as claimed in claim 17, further comprising the act of writing on the first layer after the confirming act.

* * * * *